United States Patent Office.

MRS. P. T. VINING, OF NEW YORK, N. Y.

Letters Patent No. 65,777, dated June 11, 1867.

---

IMPROVEMENT IN PRESERVING FLOWERS AND OTHER VEGETABLE FORMS.

---

The Schedule referred to in these Letters Patent and making part of the same.

---

Be it known that I, P. T. Vining, now residing in the city, county, and State of New York, have invented a new and improved Method of Preserving Flowers, Fruits, and other Vegetable Growths for ornamental and other purposes; and I do hereby declare and ascertain my said improvement as follows:

It has frequently been essayed to so prepare flowers and other vegetable growths as to retain their forms and color indefinitely, but so far as I have been informed they are all difficult of execution and imperfect in their results. Of this nature are the methods of enclosing the leaves and petals in wax, &c.

My invention is for preserving the objects in their natural state, without change of form or color, retaining flowers, &c., in their original freshness and beauty for an indefinite period.

For this purpose I take the object to be operated on, say a rose or other flower, and with a soft brush I apply to the petals and about the stamens, calyx, &c., a liquid solution of glass or other silicate, or analogous material, and let it dry. This firmly secures the parts of the flower to the stem. The flower thus prepared is then placed in an air-tight receiver or case from which the air is exhausted. This alone will preserve the flower in all its beauty for months; but I prefer, to make the preservation more perfect, and of longer duration, to fill the air-tight receiver or case with an atmosphere of carbonic acid gas, in which the flowers are more perfectly preserved, and more freshly, than in any other way. Carbonic acid gas being the best and most practical way of nourishing the preserved flower, as carbon is the nutriment of vegetables, in this atmosphere it will remain unchanged. The case or receiver should be in part of glass, and of any form suitable to properly exhibit the flowers contained therein, and as carbonic acid gas is subject to great expansion by heat, there should be an elastic medium in some portion of the case to allow an expansion and contraction of the size of the chamber without undue pressure upon the interior or exterior of the case. To those flowers, the colors of which will n time fade, I apply the silicate, and then sprinkle them with pulverized glass or transparent quartz, which is a great preservative of color against the light thereon, and this crystallizing process may be used to beautify leaves, flowers, and other objects. To preserve fruit, I immerse it in silicate, and when dry it is placed in the receiver and treated as the flowers above described.

Having thus set forth my new and improved method of preserving flowers and other vegetable products, what I claim as my invention, and for which I desire Letters Patent, is—

The employment of a solution of glass or other liquid silicate, substantially as and for the purposes set forth.

I also claim, in combination with the above, the pulverized glass or silica, all as herein specified.

I also claim enclosing the objects as herein set forth in a vacuum, when they have been thus prepared.

I also claim filling the receiver in which objects prepared as above set forth are placed, with an atmosphere of carbonic acid gas.

I also claim the receiver for containing the carbonic acid gas as herein described, having an elastic or yielding portion to allow of the expansion of said gas without undue pressure in the chamber of said receiver.

P. T. VINING.

Witnesses:
 Henry E. Klugh,
 J. J. Greenough.